United States Patent
Kuno

(10) Patent No.: US 8,730,519 B2
(45) Date of Patent: May 20, 2014

(54) IMAGE PROCESSING DEVICE AND IMAGE-PROCESSING METHOD

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 87 days.

(21) Appl. No.: 13/226,455

(22) Filed: Sep. 6, 2011

(65) Prior Publication Data
US 2012/0062908 A1  Mar. 15, 2012

(30) Foreign Application Priority Data
Sep. 10, 2010  (JP) ................................. 2010-203074

(51) Int. Cl.
*G06K 13/10* (2006.01)

(52) U.S. Cl.
USPC .............................................. 358/1.8; 347/15

(58) Field of Classification Search
USPC ...................................... 358/1.8, 1.9; 347/15
See application file for complete search history.

(56) References Cited

U.S. PATENT DOCUMENTS

| | | | |
|---|---|---|---|
| 5,506,698 A | 4/1996 | Nishihara | |
| 5,596,353 A | 1/1997 | Takada et al. | |
| 5,736,996 A | 4/1998 | Takada et al. | |
| 5,896,469 A | 4/1999 | Murakami | |
| 6,089,691 A | 7/2000 | Kakutani | |
| 6,099,105 A | 8/2000 | Kakutani | |
| 7,539,342 B2 * | 5/2009 | Tabata et al. | 382/167 |
| 7,770,993 B2 * | 8/2010 | Yamakado | 347/15 |
| 8,366,228 B2 * | 2/2013 | Yoshida | 347/15 |
| 2002/0051023 A1 | 5/2002 | Teshigawara et al. | |
| 2003/0043219 A1 | 3/2003 | Kojima | |
| 2003/0169320 A1 | 9/2003 | Tomotake et al. | |
| 2010/0165032 A1 | 7/2010 | Yoshida | |
| 2012/0188561 A1 | 7/2012 | Kuno | |
| 2012/0188609 A1 | 7/2012 | Kuno | |

FOREIGN PATENT DOCUMENTS

| | | |
|---|---|---|
| EP | 0665105 A1 | 8/1995 |
| EP | 0763797 A2 | 3/1997 |
| EP | 1690689 A2 | 8/2006 |

(Continued)

OTHER PUBLICATIONS

Japan Patent Office, Office Action for Japanese Patent Application No. 2010-203074 (counterpart Japanese patent application), mailed Nov. 6, 2012.

(Continued)

*Primary Examiner* — Mark Zimmerman
*Assistant Examiner* — Marchelle L Taggart
(74) *Attorney, Agent, or Firm* — Baker Botts L.L.P.

(57) ABSTRACT

An image processing device includes: a process section; a generation section; and a supply section. The process section includes: an index value determination section; and an adjustment section. The index value determination section is configured to determine an index value for each of a plurality of target pixels included in edge image data. The adjustment section is configured not to adjust a pixel value of the target pixel in a first case where the density of the target pixel is determined to be relatively low based on the index value of the target pixel, and configured to adjust the pixel value of the target pixel so as to reduce the density of the target pixel in a second case where the density of the target pixel is determined to be relatively high based on the index value of the target pixel.

17 Claims, 10 Drawing Sheets

(56) References Cited

FOREIGN PATENT DOCUMENTS

| | | |
|---|---|---|
| JP | H07-093534 A | 4/1995 |
| JP | 2002-011861 A | 1/2002 |
| JP | 2002-200745 A | 7/2002 |
| JP | 2003-062984 A | 3/2003 |
| JP | 2003-237062 A | 8/2003 |
| JP | 2003-300312 A | 10/2003 |
| WO | 98/03341 A1 | 1/1998 |

OTHER PUBLICATIONS

European Patent Office, extended European Search Report for European Patent Application No. 11180264.1 (counterpart European patent application), dated Jan. 24, 2013.
State Intellectual Property Office of the People's Republic of China, Notification of First Office Action for Chinese Patent Application No. 201110273675.X (counterpart to above-captioned patent application), mailed Dec. 3, 2013.

* cited by examiner

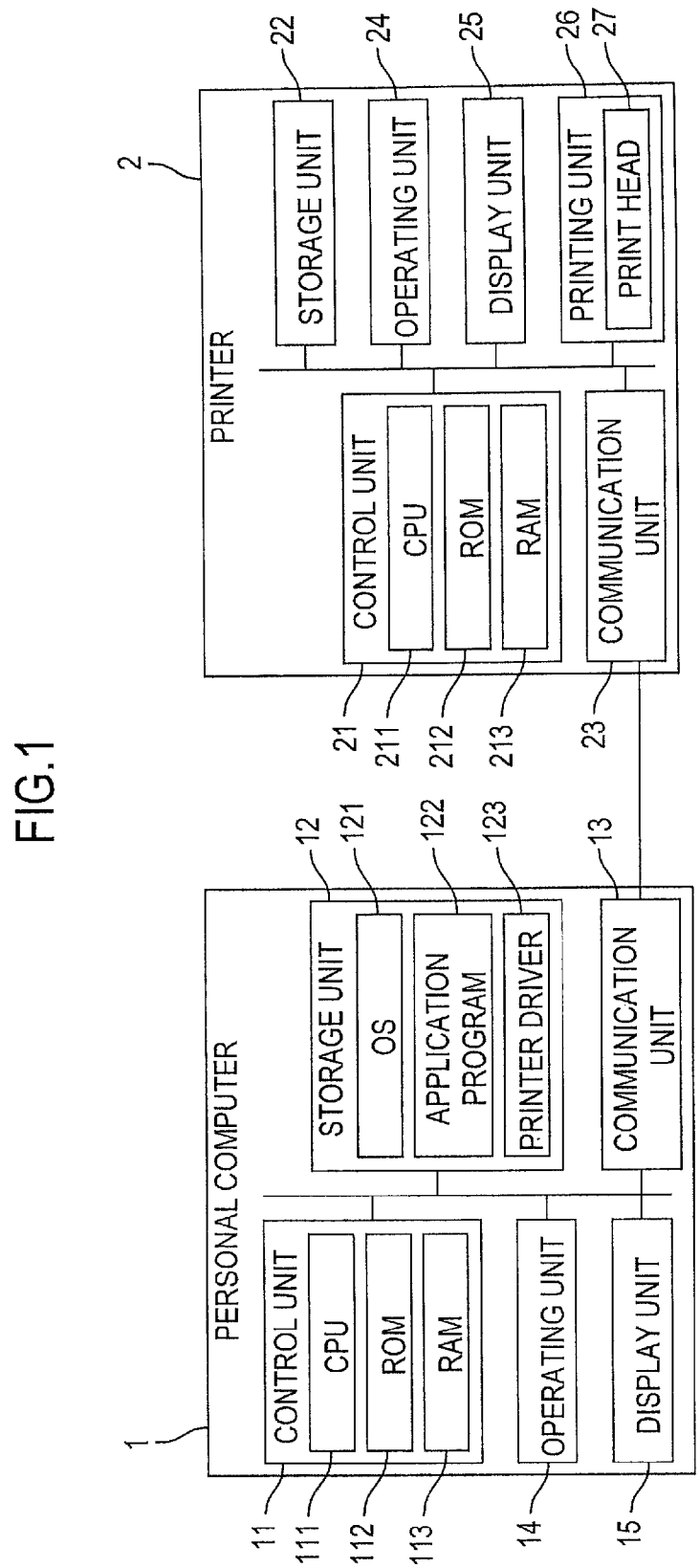

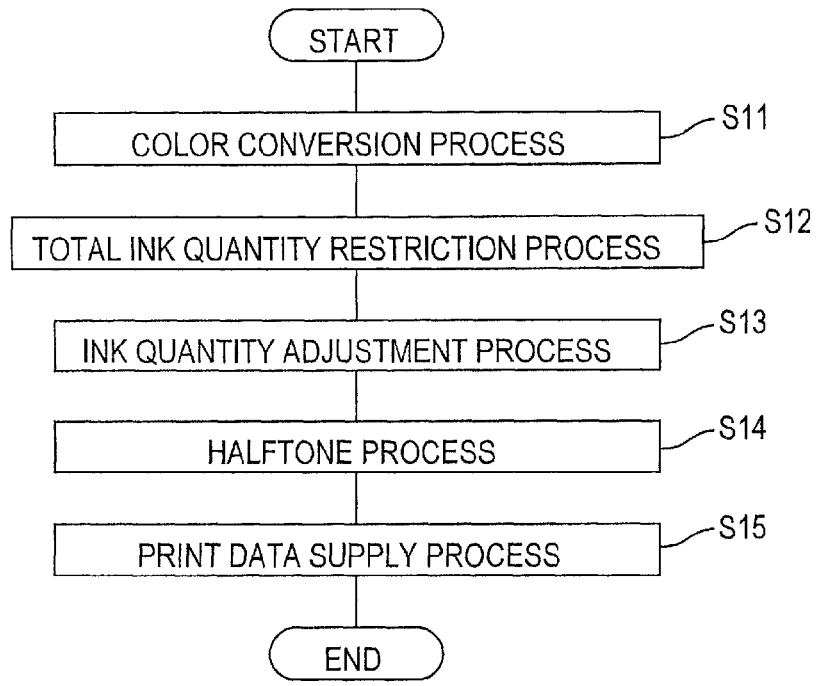
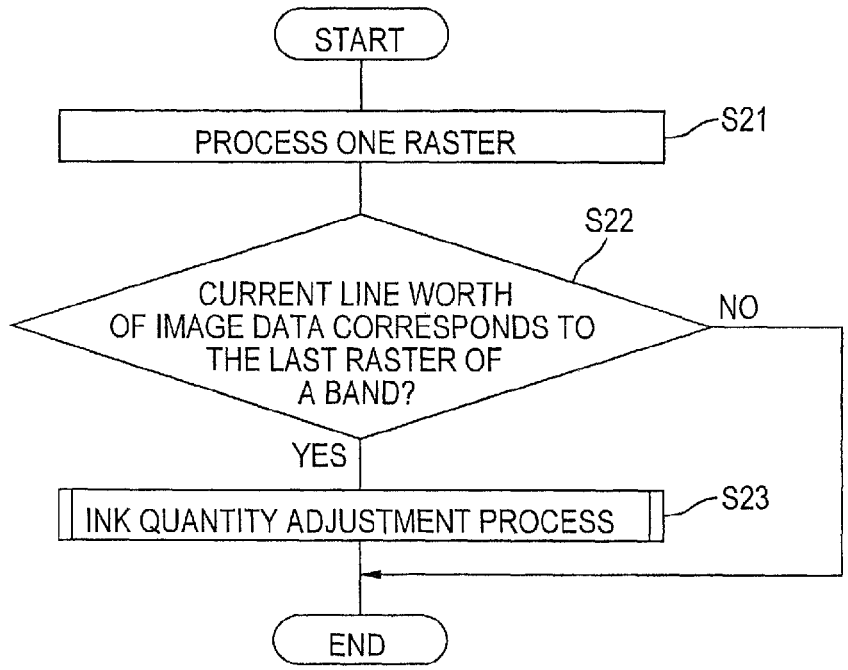

| Cyan | Magenta | Yellow | Black | Ink quantity restriction value |
|---|---|---|---|---|
| 0% | 0% | 0% | 0% | 100% |
| 0% | 0% | 0% | 100% | 100% |
| 0% | 0% | 100% | 0% | 90% |
| 0% | 0% | 100% | 100% | 100% |
| 0% | 100% | 0% | 0% | 80% |
| 0% | 100% | 0% | 100% | 100% |
| 0% | 100% | 100% | 0% | 75% |
| 0% | 100% | 100% | 100% | 100% |
| 100% | 0% | 0% | 0% | 80% |
| 100% | 0% | 0% | 100% | 100% |
| 100% | 0% | 100% | 0% | 75% |
| 100% | 0% | 100% | 100% | 100% |
| 100% | 100% | 0% | 0% | 75% |
| 100% | 100% | 0% | 100% | 100% |
| 100% | 100% | 100% | 0% | 50% |
| 100% | 100% | 100% | 100% | 100% |

IMAGE PROCESSING DEVICE AND IMAGE-PROCESSING METHOD

CROSS REFERENCE TO RELATED APPLICATION

This application claims priority from Japanese Patent Application No. 2010-203074 filed Sep. 10, 2010. The entire content of this priority application is incorporated herein by reference.

TECHNICAL FIELD

The present invention relates to an image-processing technology for generating print data.

BACKGROUND

A conventional inkjet-type printing device has a print head with rows of nozzles formed therein for ejecting ink droplets. This conventional printing device prints an image on paper by ejecting ink droplets from the rows of nozzles toward the paper while the print head is being conveyed in a main scanning direction orthogonal to the rows of nozzles.

This type of printing device prints in units of a strip-like area, referred to as a "band," that has a width equivalent to the length of the nozzle rows. The printing device prints one band for each main scan of the print head. Thus, when printing an image over a region wider than a single band, such as a sheet of paper, the printing device repeatedly prints images in units of bands while shifting the position of the paper in the sub-scanning direction for each band unit.

Further, the number of gradations that the conventional printing device can render by ink drops ejected from the print head is less than the number of gradations (256-levels, for example) in the original image data representing the target image. Therefore, a halftone process is performed to produce print data with a fewer number of gradations, and the printing device ejects ink droplets from the print head based on this print data.

An inherent problem of this technology is that the printing device will sometimes produce a dark streak in the printed image along a seam between two adjacent bands printed in different main scans. Various techniques have been proposed to address this problem, including a technique for thinning pixels in regions of the print data produced from a halftone process that correspond to regions in the image in proximity to the seams (first technique), and a technique for reducing the quantity of ink ejected in such areas by reducing a droplet diameter rank for pixels in those areas (second technique). These techniques attempt to mitigate streaks that can be produced along the seams between pairs of neighboring bands printed in different main scans by processing the print data produced from the halftone process. The print data is processed to reduce the quantity of ink used when printing areas along the seams.

SUMMARY

However, it is desirable to use a different technique to mitigate streaks produced along the borderlines between neighboring bands, i.e., adjacent unit printing areas that are printed in separate main scans.

Therefore, it is an object of the present invention to provide another technique for this purpose. That is, an object of the present invention is to provide another technique to mitigate streaks produced along the borderlines between neighboring bands.

In order to attain the above and other objects, the present invention provides an image processing device for processing image data indicative of an image to be printed by a print execution section, the print execution section having a print head that is reciprocated in a main scanning direction and that is capable of printing a partial image in a unit printing area for each main scan, the image processing device including: a process section; a generation section; and a supply section. The process section is configured to execute an image process on image data so as to generate processed image data. The generation section is configured to execute a halftone process on the processed image data so as to generate print data. The supply section is configured to supply the print data to the print execution section. The process section includes: an index value determination section; and an adjustment section. The index value determination section is configured to determine an index value for each of a plurality of target pixels included in edge image data, the index value for each target pixel being related to density of the target pixel, wherein the edge image data corresponds to an edge portion of a unit printing area and is part of partial image data within the image data, and the partial image data corresponds to the unit printing area. The adjustment section is configured not to adjust a pixel value of the target pixel in a first case where the density of the target pixel is determined to be relatively low based on the index value of the target pixel, and configured to adjust the pixel value of the target pixel so as to reduce the density of the target pixel in a second case where the density of the target pixel is determined to be relatively high based on the index value of the target pixel.

According to another aspect, the present invention provides a method of processing image data indicative of an image to be printed by a print execution section, the print execution section having a print head that is reciprocated in a main scanning direction and that is capable of printing a partial image in a unit printing area for each main scan, the method including: executing an image process on image data to generate processed image data; executing a halftone process on the processed image data to generate print data; and supplying the print data to the print execution section; the executing the image process including: determining an index value for each of a plurality of target pixels included in edge image data, the index value for each target pixel being related to density of the target pixel, wherein the edge image data corresponds to an edge portion of a unit printing area and is part of partial image data within the image data, and the partial image data corresponds to the unit printing area; and failing to adjust a pixel value of the target pixel in a first case where the density of the target pixel is determined to be relatively low based on the index value of the target pixel, and adjusting the pixel value of the target pixel so as to reduce the density of the target pixel in a second case where the density of the target pixel is determined to be relatively high based on the index value of the target pixel.

According to still another aspect, the present invention provides a computer readable storage device storing a set of image-processing program instructions executable by a computer to process image data indicative of an image to be printed by a print execution section, the print execution section having a print head that is reciprocated in a main scanning direction and that is capable of printing a partial image in a unit printing area for each main scan, the program instructions including: executing an image process on image data to generate processed image data; executing a halftone process on the processed image data to generate print data; and supplying the print data to the print execution section; the executing the image process including: determining an index value for each of a plurality of target pixels included in edge image data, the index value for each target pixel being related to density of the target pixel, wherein the edge image data corresponds to an edge portion of a unit printing area and is part of partial image data within the image data, and the partial image data corresponds to the unit printing area; and failing to adjust a pixel value of the target pixel in a first case where the density of the target pixel is determined to be relatively low based on the index value of the target pixel, and adjusting the pixel value of the target pixel so as to reduce the density of the target pixel in a second case where the density of the target pixel is determined to be relatively high based on the index value of the target pixel.

BRIEF DESCRIPTION OF THE DRAWINGS

The particular features and advantages of the invention as well as other objects will become apparent from the following description taken in connection with the accompanying drawings, in which:

FIG. 1 is a block diagram showing the general structure of a printing system according to a first embodiment of the present invention;

FIG. 2(*b*) is an explanatory diagram illustrating the cause of the streaks shown in FIG. 2(*a*);

FIG. 3 is a flowchart illustrating steps in a process that is executed by a personal computer in the printing system of FIG. 1 when the personal computer functions as a printer driver;

FIG. 4 is a flowchart illustrating steps in a process for identifying a line worth of image data that has to be subjected to an ink quantity adjustment process in FIG. 3;

FIG. 6(*b*) is a graph showing correlations between ink quantity index values and ink quantity restriction values that decrease linearly as the ink quantity index values increase according to a modification;

FIG. 13(*b*) is an explanatory diagram showing streaks that can be produced in two-pass printing when the paper is conveyed by nonuniform amounts in the sub-scanning direction.

DETAILED DESCRIPTION

Figure 2A:
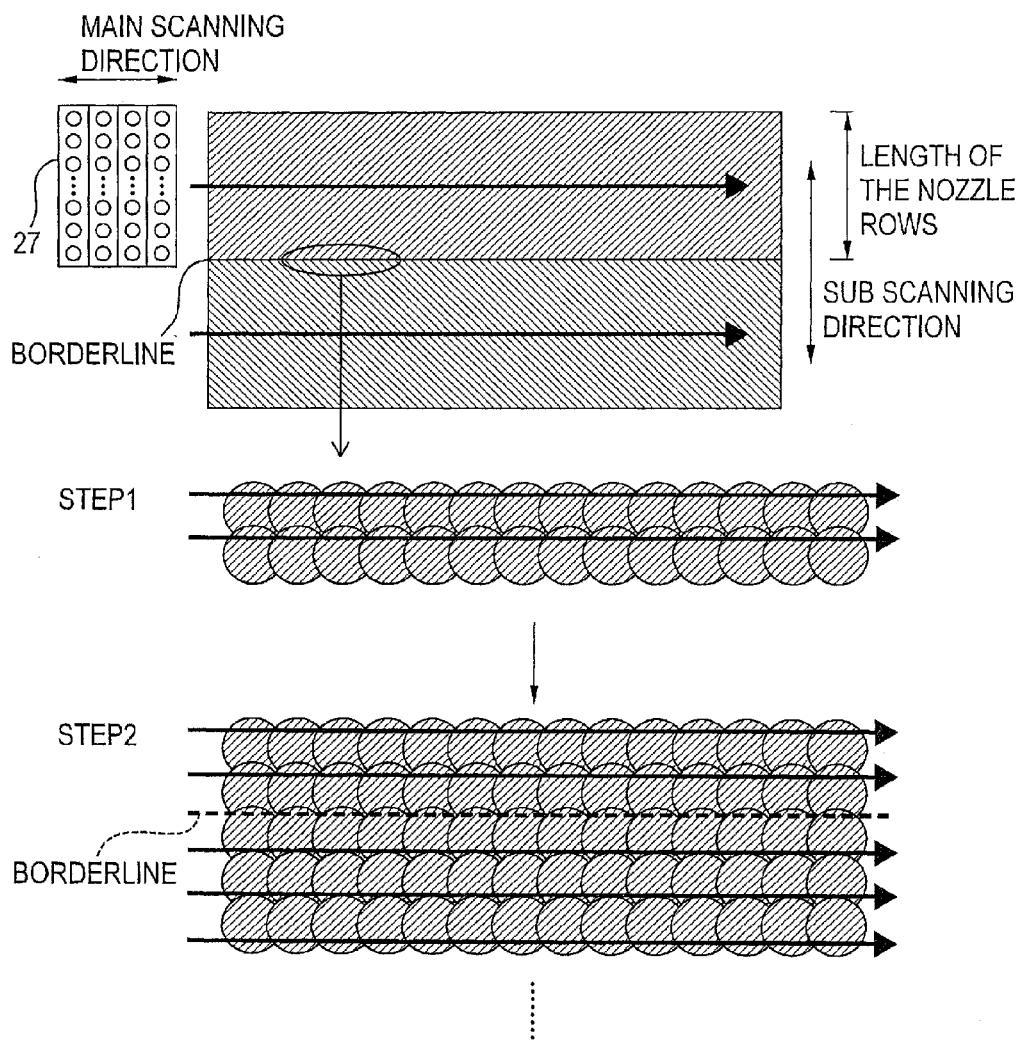
FIG. 2(*a*) is an explanatory diagram illustrating streaks that may be produced in single-pass printing.

Next, embodiments of the present invention will be described while referring to the accompanying drawings.

1. First Embodiment 1-1. Overall Structure of a Printing System

FIG. 1 is a block diagram showing the overall structure of a printing system according to the first embodiment. The printing system is configured of a personal computer (PC) 1 and a printer 2. The PC 1 and printer 2 can communicate with each other and exchange data.

The PC 1 is a general-purpose data processor provided with a control unit 11, a storage unit 12, a communication unit 13, an operating unit 14, and a display unit 15.

The control unit 11 performs overall control of various components of the PC 1. The control unit 11 includes a CPU 111, a ROM 112, and a RAM 113. The storage unit 12 is a nonvolatile storage device for storing data that can be overwritten. In the embodiment, a hard disk drive is employed as the storage unit 12. Various software programs are installed on the storage unit 12, including an operating system (OS) 121, an application program 122 such as a graphics tool, and a printer driver 123. The printer driver 123 is a software program for enabling the PC 1 to use the printer 2. The communication unit 13 is an interface for conducting data communications with the printer 2. The operating unit 14 is configured of input devices that allow the user to input instructions in the PC 1 through external operations. In the embodiment, the operating unit 14 includes a keyboard and a pointing device, such as a mouse or a touchpad. The display unit 15 is an output device for displaying various data as images that convey information to the user. In the embodiment, a liquid crystal display is used as the display unit 15.

The printer 2 in the embodiment is an inkjet-type printing device. The printer 2 includes a control unit 21, a storage unit 22, a communication unit 23, an operating unit 24, a display unit 25, and a printing unit 26.

The control unit 21 performs overall control of various components of the printer 2. The control unit 21 includes a CPU 211, a ROM 212, and a RAM 213. The storage unit 22 is a nonvolatile storage device for storing data that can be overwritten. In the embodiment, flash memory is employed as the storage unit 22. The communication unit 23 is an interface for conducting data communications with the PC 1. The operating unit 24 is an input device having various operating buttons that allow the user to input commands in the printer 2 through external operations. The display unit 25 is an output device configured of a small liquid crystal display for displaying various data as images that convey information to the user.

The printing unit 26 includes a print head 27 that can be reciprocated in a direction (hereinafter referred to as the "main scanning direction") orthogonal to the direction (hereinafter referred to as the "sub scanning direction") in which paper is conveyed. The printing unit 26 prints images on paper by ejecting ink droplets based on print data while the print head 27 is reciprocated. More specifically, a plurality of nozzles is formed in the bottom surface (surface opposing the paper) of the print head 27. The nozzles are arranged in rows that extend in the sub scanning direction and serve to eject ink droplets in the colors cyan (C), magenta (M), yellow (Y), and black (K). One row of nozzles is provided for each color, for a total of four nozzle rows (see FIG. 2(a)). Note that the print head 27 in FIG. 2(a) is shown from the side opposite the surface in which the nozzle rows are formed. Although the nozzle rows are not visible from this side, the positions of the nozzle rows on the bottom surface are depicted for description purposes.

The printer 2 according to the embodiment uses dye-based ink for the CMY colors and pigment ink for the K color. Dye-based inks readily penetrate the internal fibers of paper, while pigment inks tend to become fixed to the surface of the paper without penetrating therein. Hence, while pigment inks have a poor fixing property on glossy paper, these pigment inks can print sharp characters and the like on normal paper.

In order to render color tones more naturally, the printing unit 26 also performs droplet control based on print data expressing each pixel of the image in one of four levels. In the embodiment, the printing unit 26 regulates the quantity of ink ejected for each droplet at one of a plurality of levels in order to produce four levels of dot formation: a large dot, a medium dot, a small dot, and no dot.

1-2. Overview of Processes Performed on the Printing System

Next, an overview of the processes executed on the printing system of the first embodiment will be described. The printer driver 123 is launched on the PC 1 when the user of the PC 1 executes a print start operation in the application program 122 while the application program 122 is running. When the printer driver 123 is launched, the control unit 11 of the PC 1 executes the following image processes (A)-(C) for controlling the printer 2 to print the target image.

(A) The control unit 11 executes an image process on original image data representing the image to be printed and expressed in 256-level (an 8-bit range for values 0-255) RGB values to generate processed image data expressed in 256-level CMYK values (the process of S11-S13 described later).

(B) The control unit 11 executes a halftone process on the processed image data to generate print data expressed in 4-level CMYK values (S14 described later).

(C) The control unit 11 supplies the print data generated above to the printer 2 (S15 described later).

After processes (A)-(C) have been executed on the PC 1, the printer 2 controls the printing unit 26 to print an image based on the print data received from the PC 1. More specifically, the printer 2 reciprocates the print head 27 in the printing unit 26 while ejecting ink droplets from the nozzles based on this print data. In one main scan, the printer 2 prints an image in one strip-like unit printing area (band) having the same width as the length of the nozzle rows. The printer 2 alternates between an operation to move the print head 27 in the reciprocating direction and an operation to convey the paper in the sub scanning direction, thereby printing images in units of bands one after another in the sub scanning direction until the entire image is printed on the sheet of paper.

Figure 2B:
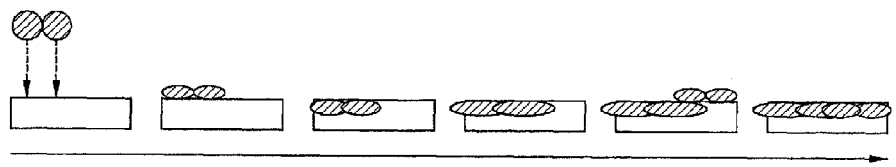

In single-pass printing, the printing unit 26 conveys the sheet of paper a distance equivalent to the length of the nozzle rows after each main scan (one pass) of the print head 27, using only one pass to print the image for a prescribed region (band). However, sometimes dark (high-density) streaks are produced along the borderline between two adjacent bands. In other words, in single-pass printing illustrated in FIG. 2(a), the printer 2 first prints a band positioned above the borderline (Step 1) and subsequently prints a band positioned below the borderline (Step 2). As illustrated in FIG. 2(b), during the period of time after the upper band is printed and until the lower band is printed, ink droplets forming the lower edge of the upper band (the position adjoining the lower band) penetrate and spread in the paper. Since this spreading increases the region of overlap with ink droplets in the lower band, this phenomenon is likely responsible for the generation of streaks.

Therefore, in the printing system of the embodiment, the PC 1 performs an ink quantity adjustment process in (A) for reducing the overall quantity of ink used to print the bordering region of bands prior to performing the halftone process in (B), thereby reducing the occurrence of streaks.

1-3. Detailed Description of Processes Performed on the Printing System

Next, a process executed by the control unit 11 of the PC 1 (more accurately, the CPU 111 of the control unit 11) as a function of the printer driver 123 will be described in detail with reference to the flowchart in FIG. 3.

In S11 of FIG. 3, the control unit 11 performs a color conversion process to convert the original image data representing the image to be printed in 256-level RGB values to image data expressed in 256-level CMYK values corresponding to the CMYK ink colors used for printing on the printer 2. This color conversion process is performed by referencing a look-up table (RGB→CMYK) which is prestored in the storage unit 12 or the like.

In S12 the control unit 11 performs a total ink quantity restriction process on all image data produced from the color conversion process in order to reduce the total quantity of ink used for printing. That is, the control unit 11 performs a process on all pixels in the image data to adjust the CMYK values so that an ink quantity index value for each pixel is restricted to no more than 140%. The term "ink quantity index value" in the embodiment refers to the sum of CMYK values inputted as pixel values for the halftone process (gradation values for the CMYK color components produced in the color conversion process) and is therefore an index value related to the density of the pixel. In the embodiment, the ink quantity index value is expressed as a percentage, where the maximum gradation value for each color component (255 in the embodiment) is considered 100%. Hence, when the gradation values for all four color components (CMYK) are all 255, the ink quantity index value (i.e., the maximum ink quantity index value) is expressed as 400%. More specifically, for the CMYK values (which will be referred to as "c %", "m %", "y %", "k %") for each pixel, if the total value x % (=c+m+y+k) exceeds 140%, the values c %, m %, y %, and k % are adjusted so that the total value x % will be equal to 140%. The control unit 11 performs this total ink quantity restriction process by referencing a look-up table (CMYK→CMYK) which is prestored in the storage unit 12 or the like.

In S13 the control unit 11 performs an ink quantity adjustment process in order to reduce the total quantity of ink used for printing the last raster in each band (the raster on the edge of the current band adjacent to the band to be printed next). Hence, in addition to performing the total ink quantity restriction process of S12, the control unit 11 also performs an ink quantity adjustment process on the last raster of each band in order to further reduce the overall quantity of ink used in printing. The ink quantity adjustment process will be described later in greater detail.

In S14 the control unit 11 performs a halftone process (an error diffusion process in the embodiment) for generating print data expressed in 4-level CMYK values that can be reproduced on the printer 2 from the image data produced in the ink quantity adjustment process (image data expressed in 256-level CMYK values).

In S15 the control unit 11 performs a print data supply process for transferring the print data to the printer 2. The printer 2 receives this print data and controls the printing unit 26 to print an image on paper based on the print data.

Next, how to execute the series of processes in S11-S13 will be described with reference to the flowchart in FIG. 4. As shown in the flowchart, the control unit 11 executes the ink quantity adjustment process only on a line worth of image data in each band of the process image data that corresponds to the last raster of the band.

Specifically, in S21 the control unit 11 processes the target image data line by line, where one line worth of image data corresponds to one raster. The process performed in S21 corresponds to the color conversion process of S11 and the total ink quantity restriction process of S12 described above.

In S22 the control unit 11 determines whether the current line worth of image data corresponds to the last raster of a band. It is noted that in S22 the control unit 11 may determine whether the image data for the current line being processed corresponds to the last raster by acquiring a nozzle number for the nozzles in the print head 27 assigned to image data in the current line, for example.

If the current line worth of image data corresponds to the last raster of a band (S22: YES), in S23 the control unit 11 executes the ink quantity adjustment process on the current line (ink quantity adjustment process of S13 in FIG. 3). However, if the current line worth of image data does not correspond to the last raster (S22: NO), the control unit 11 ends the process in FIG. 4 without executing the ink quantity adjustment process on the current line worth of image data. The process then proceeds to the next line worth of image data. In other words, the process of FIG. 4 is executed on the next line worth of image data. In this way, the process of FIG. 4 is executed repeatedly onto the successive lines of worth of image data line by line.

Figure 5:
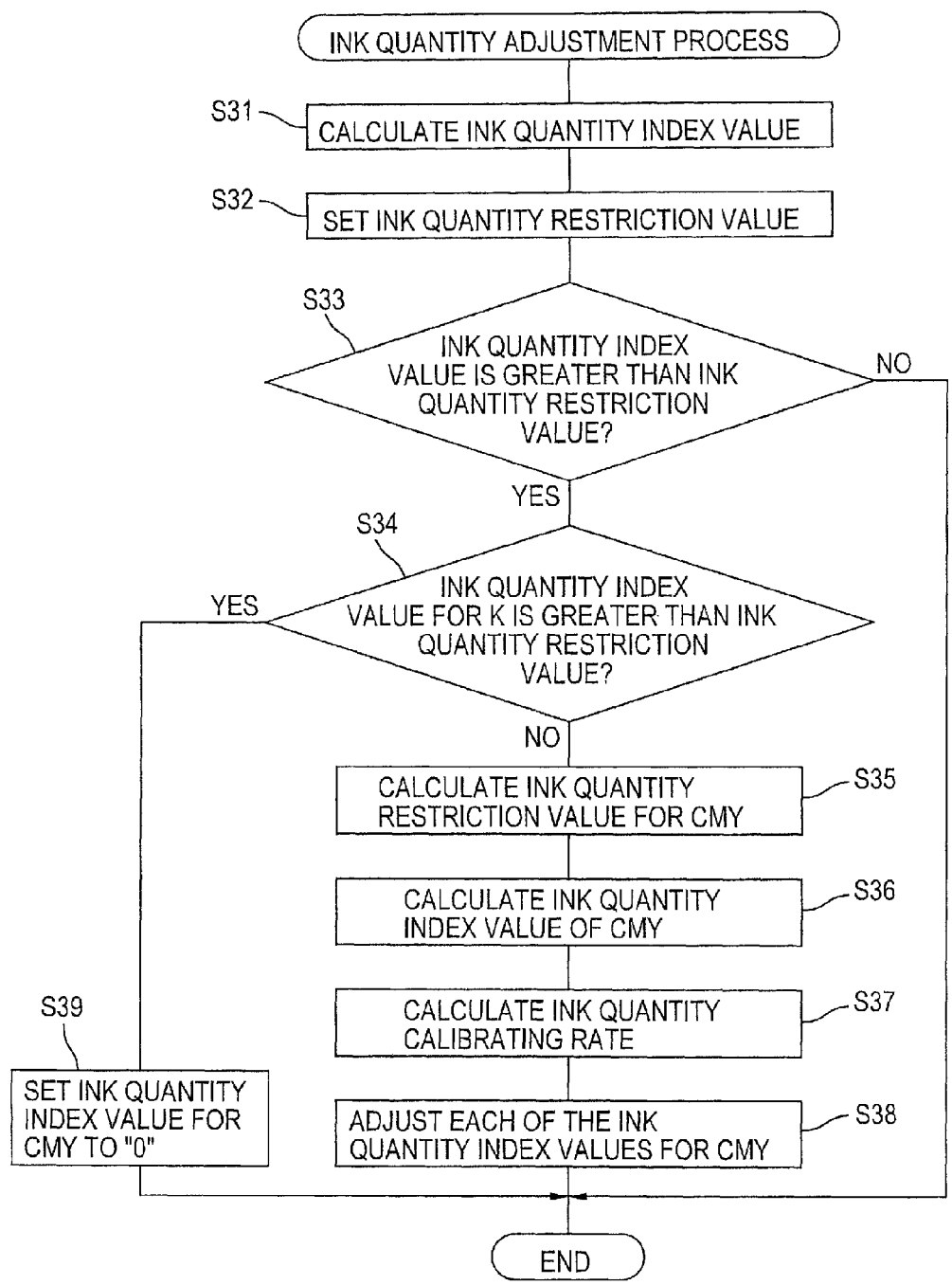
FIG. 5 is a flowchart illustrating steps in the ink quantity adjustment process of the first embodiment.

FIG. 5 is a flowchart illustrating steps in the ink quantity adjustment process of S23. The control unit 11 executes this process for each pixel in a line worth of image data corresponding to the last raster of a band.

In S31 at the beginning of the ink quantity adjustment process in FIG. 5, the control unit 11 totals the CMYK values for the target pixel and sets the ink quantity index value for the target pixel to the sum total.

In S32 the control unit 11 sets an ink quantity restriction value as a target value for restricting the ink quantity index value of the target pixel. FIG. 6(*a*) is a graph showing correlations between ink quantity index values and ink quantity restriction values. These correlations are prestored in the storage unit 12 as a computational expression or a look-up table. In the example shown in FIG. 6(*a*), the smallest ink quantity index value that is subjected to restriction has been set to 60%, and the ink quantity restriction value is set to 100% for the maximum ink quantity index value (140% since the total quantity of ink has already been restricted in the total ink quantity restriction process). The smallest ink quantity index value is set to a value for preventing the generation of streaks, and the ink quantity restriction value for the maximum ink quantity index value is set to prevent streaks from becoming noticeable.

The ink quantity restriction value increases linearly from 60 to 100% as the ink quantity index value increases from 60 to 140%. These correlations have such characteristics in that the amount of reduction from the ink quantity index value to the ink quantity restriction value is the largest at the maximum ink quantity index value and decreases as the ink quantity index value decreases from the maximum ink quantity index value. Hence, in S32 the control unit 11 references the correlations stored in the storage unit 12 and sets the ink quantity restriction value for the target pixel to the value associated with the ink quantity index value for the target pixel.

In S33 the control unit 11 determines whether the ink quantity index value for the target pixel is greater than the ink quantity restriction value. When the control unit 11 determines in S33 that the ink quantity index value for the target pixel is not greater than the ink quantity restriction value (when the ink quantity index value of the target pixel is no greater than 60% in the embodiment; S33: NO), the control unit 11 ends this ink quantity adjustment process with no further action. That is, the control unit 11 does not adjust the CMYK values for the target pixel when determining that the density of the pixel is relatively low.

However, when the control unit 11 determines that the density of the target pixel is relatively high, the control unit 11 adjusts the CMY values for the target pixel in order to reduce the density, as will be described next. Specifically, when the control unit 11 determines in S33 that the ink quantity index value for the target pixel is greater than the ink quantity restriction value (when the ink quantity index value for the target pixel exceeds 60% in the embodiment; S33: YES), then in S34 the control unit 11 determines whether the ink quantity index value for K (black) in the target pixel is greater than the ink quantity restriction value. Here, the ink quantity index value for K is the gradation value for the K-component of the target pixel and is expressed as 100% for the maximum gradation value (255 in the embodiment).

When the control unit 11 determines in S34 that the ink quantity index value of K is no greater than the ink quantity restriction value (S34: NO), then in S35 the control unit 11 calculates an ink quantity restriction value for CMY by subtracting the ink quantity index value for K from the ink quantity restriction value.

In S36 the control unit 11 calculates the ink quantity index value of CMY. Here, the ink quantity index value of CMY is the sum of gradation values for CMY in the target pixel and is expressed as 100% for the maximum gradation value (255 in the embodiment). The ink quantity index value for CMY may be calculated by subtracting the ink quantity index value of K from the ink quantity index value of the target pixel calculated in S31 (the ink quantity index value of CMYK) or may be calculated by totaling the ink quantity index value for each of the CMY colors.

In S37 the control unit 11 calculates an ink quantity calibrating rate from the following Equation (1):

$$\text{(Ink quantity calibrating rate)} = \text{(ink quantity restriction value for CMY)} / \text{(ink quantity index value for CMY)} \quad \text{Equation (1)}$$

In S38 the control unit 11 adjusts each of the ink quantity index values for CMY by multiplying each ink quantity index value by the ink quantity calibrating rate calculated in S37. Here, the ink quantity index value for each of CMY is the gradation value for the C, M, or Y-component of the target pixel and is expressed as 100% for the maximum gradation value (255 in the embodiment). Subsequently, the control unit 11 ends the ink quantity adjustment process. In this way, the control unit 11 adjusts each of the CMY values for the target pixel using the same ratio, whereby the ink quantity index value of the target pixel (ink quantity index value of CMYK) is adjusted to the ink quantity restriction value.

However, when the control unit 11 determines in S34 that the ink quantity index value of K is greater than the ink quantity restriction value (S34: YES), in S39 the control unit 11 sets the ink quantity index value for CMY to zero (0). In other words, the control unit 11 sets the gradation values for C, M, and Y to "0". In this way, when it is not possible to adjust the ink quantity index value of the target pixel (the ink quantity index value for CMYK) to the ink quantity restriction value without reducing the ink quantity index value for K, the control unit 11 adjusts the ink quantity index value for each of the CMY as much as possible without reducing the ink quantity index value for K.

In the first embodiment described above, the PC 1 adjusts pixel values in the image data before performing a halftone process so as to reduce the density of each pixel belonging to the last raster in each band when the density is relatively high. More specifically, after the image data has undergone a color conversion process, the PC 1 adjusts the CMY values for target pixels in the image data so that the ink quantity index value of the target pixel is set to the ink quantity restriction value. By performing these adjustments, the PC 1 can suitably reduce the total quantity of ink used for printing the last raster of a band and, as a result, can mitigate streaks produced along the border between two bands printed in different main scans of the print head 27.

Since the gradation values for the CMYK color components of the target pixel affect the quantity of ink used in the respective colors corresponding to the CMYK color components, the quantity of ink used for printing the target pixel tends to decrease as the sum of the pixel's CMYK gradation values decreases. Hence, the PC 1 can suitably reduce the overall quantity of ink used for printing the last raster of each band by adjusting the gradation values for the CMY color components in the target pixel so that the sum of the CMYK gradation values is equivalent to the target value.

As described earlier, dye-based ink tends to produce streaks because the ink readily penetrates the fibers of paper, while pigment ink is less likely to produce streaks since this ink tends to adhere to the surface of paper rather than penetrating therein. If the PC 1 were to reduce the ink quantity index value for pigment ink, noticeable white streaks may be formed between rasters in adjacent bands rather than the black streaks caused by rasters in adjacent bands bleeding together and overlapping. Therefore, the PC 1 according to the embodiment improves printing quality by adjusting only values of CMY colors printed in dye-based ink and not the value of K printed in pigment ink for each target pixel. Moreover, the PC 1 avoids changing the appearance of colors when adjusting CMY values by adjusting these values at an equal percentage.

A particular feature of the present embodiment is that the PC 1 sets the ink quantity index value of CMY to "0" when the ink quantity index value of K for the target pixel exceeds the ink quantity restriction value. Hence, the PC 1 can set the ink quantity index value for the target pixel as close as possible to the ink quantity restriction value without adjusting the ink quantity index value for K.

Further, by increasing the ink quantity restriction value in response to increases in the ink quantity index value, the PC 1 can adjust the ink quantity restriction value to a value suitable for the ink quantity index value of the target pixel.

2. Second Embodiment

2-1. Differences from the Printing System According to the First Embodiment

The printing system according to the second embodiment is identical to that described in the first embodiment, except for the method of establishing ink quantity restriction values. In the first embodiment, correlations between the ink quantity index values and ink quantity restriction values are preset (FIG. 6(a)) and the control unit 11 of the PC 1 sets the ink quantity restriction value for a target pixel by referencing these correlations in the process of S32 (FIG. 5). In the second embodiment, correlations between combinations of RGB values and ink quantity restriction values are preset and the control unit 11 sets the ink quantity restriction value for a target pixel by referencing these correlations in S32. In other words, while the PC 1 according to the first embodiment obtains an ink quantity restriction value corresponding to an ink quantity index value, which is the sum of the CMYK values, the PC 1 according to the second embodiment acquires an ink quantity restriction value corresponding to the combination of RGB values. That is, the PC 1 according to the second embodiment acquires an ink quantity restriction value corresponding to the color. In the following description, reference numerals in the first embodiment are appropriated to common parts and components in the second embodiment, and a description of aspects common to both embodiments is not repeated.

2-2. Look-Up Table

Figures 7, 8:
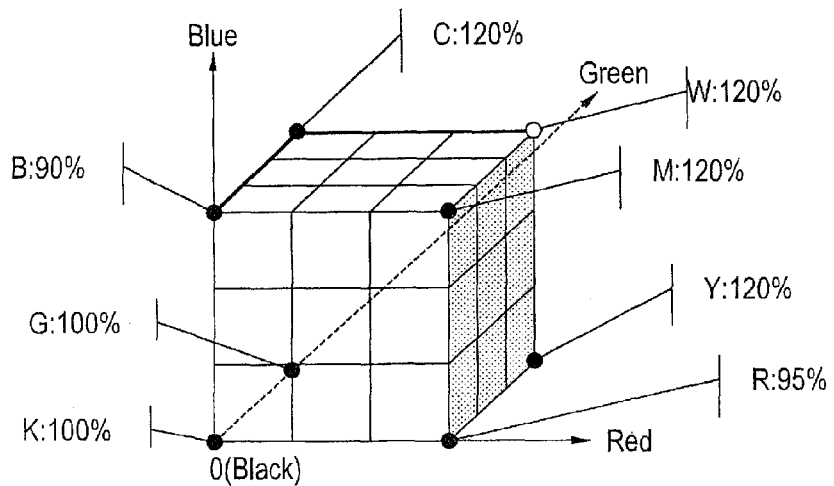
FIG. 7 is an explanatory diagram of a look-up table for defining correlations between combinations of RGB values and ink quantity restriction values.
FIG. 8 is a sample look-up table defining correlations between combinations of CMYK values and ink quantity restriction values.

FIG. 7 is an explanatory diagram of a look-up table. The control unit 11 of the PC 1 references this look-up table in S32 of the ink quantity adjustment process (FIG. 5). The look-up table defines correlations between combinations of RGB values and ink quantity restriction values. An ink quantity restriction value is recorded for each lattice point in the RGB color space, the lattice points mapping to the eight vertices of the RGB cube corresponding to maximum and minimum values along each of the RGB axes. The control unit 11 of the PC 1 calculates ink quantity restriction values for RGB values other than those at the lattice points through interpolation using the ink quantity restriction values for the eight lattice points.

In FIG. 7, point R corresponds to the maximum value for red. The color represented by this point is formed with primarily magenta and yellow ink. Since these inks bleed considerably, the ink quantity restriction value is set to 95%. Point M corresponds to the maximum values for red and blue. Since the color represented by this point is rendered in mostly magenta ink, the ink quantity restriction value is set to 120%. The ink quantity restriction value is set greater than 100% because the color for this point is not rendered in magenta alone, even though it is rendered in mostly magenta ink. This aspect is shared with points C and Y described below. Point B corresponds to the maximum value for blue. The color represented by this point is formed primarily in magenta and cyan ink. Since both of these inks bleed considerably, the ink quantity restriction value is set to 90%. Point C corresponds to the maximum values for green and blue. Since this color is rendered in mostly cyan ink, the ink quantity restriction value is set to 120%. Point G corresponds to the maximum value for green. The color at this point is formed using primarily yellow and cyan inks. Since these colors bleed considerably, the ink quantity restriction value is set to 100%. Point Y corresponds to the maximum values for red and green. Since the color at this point is rendered in mostly yellow ink, the ink quantity restriction value is set to 120%. Point K represents black. Since it is acceptable to render this color in black alone, the ink quantity restriction value is set to 100%. Point W represents white. Although printing is not performed for white, the ink quantity restriction value for point W is set to 120%, which is the maximum ink quantity restriction value of its neighboring lattice points, for use in interpolation.

Although ink quantity restriction values are recorded for only eight lattice points in this example, it is possible to record values for more than eight lattice points. For example, ink quantity restriction values may be recorded for lattice points corresponding to the vertices of a plurality of cube (or rectangular parallelepiped) shaped regions formed by dividing the RGB color space into a prescribed number of nearly equal segments along each RGB axis. Ink quantity restriction values corresponding to RGB values not coinciding with a lattice point are calculated through interpolation using the ink quantity restriction values assigned to the nearest eight lattice points. While the RGB color space is divided into three segments along each of the RGB axes in FIG. 7, the number of segments (or number of lattice points) is not limited to three and is merely set to three in this drawing to illustrate the concept. For example, if the RGB color space were divided into eight segments along each of the RGB axes, the nine lattice points along each axis can be represented by the 8-bit values 0, 32, 64, 96, 128, 160, 192, 224, and 255. Alternatively, the RGB color space could be divided into sixteen segments along each axis to provide lattice points in seventeen steps in each direction.

In the second embodiment described above, the PC 1 adjusts the CMYK values of target pixels that have undergone a color conversion process but not the halftone process. The PC 1 adjusts these CMYK values of the target pixels according to ink quantity restriction values that are set based on the RGB values of the target pixels, which are the pixel values of the target pixels before the target pixels have undergone the color conversion process.

According to the second embodiment described above, when the input values for a halftone process are CMYK values and the sum of the CMYK values (the ink quantity index value) is the same for two different target pixels, the PC 1 according to the second embodiment can set the ink quantity restriction values for these target pixels to different values that account for their different colors. Hence, unlike the PC 1 according to the first embodiment that sets ink quantity restriction values based on the sum of the CMYK values, the PC 1 according to the second embodiment can more suitably adjust the CMYK values for the target pixels.

More specifically, while RGB values are expressed as a combination of three 256-level parameters, CMYK values are expressed as a combination of four 256-level parameters. Consequently, while there always exist CMYK values corresponding to RGB values, the converse is not always true. In other words, there are not always RGB values that correspond to CMYK values. Hence, there exist some combinations of CMYK values that cannot be absolutely reproduced through a color conversion process from RGB values. As a result, it is more efficient to define correlations between RGB values and ink quantity restriction values than to define correlations between CMYK values and ink quantity restriction values.

3. Third Embodiment

3-1. Differences from the Printing System According to the First Embodiment As with the printing system according to the second embodiment, the printing system according to the third embodiment is identical to that described in the first embodiment, except for the method of establishing ink quantity restriction values. In the third embodiment, correlations between combinations of CMYK values and ink quantity restriction values are preset, and the control unit 11 sets ink quantity restriction values for target pixels by referencing these correlations in S32 of FIG. 5. In other words, while the PC 1 according to the first embodiment obtains an ink quantity restriction value corresponding to an ink quantity index value, which is the sum of the CMYK values, the PC 1 according to the third embodiment acquires an ink quantity restriction value corresponding to the combination of CMYK values. Hence, as described in the second embodiment, the PC 1 according to the third embodiment acquires an ink quantity restriction value corresponding to the color. In the following description, reference numerals in the first embodiment are appropriated to common parts and components in the third embodiment, and a description of aspects common to both embodiments is not repeated.

3-2. Look-Up Table

FIG. 8 is an explanatory diagram of a look-up table that the control unit 11 of the PC 1 references in S32 of the ink quantity adjustment process. The look-up table defines correlations between combinations of CMYK values and ink quantity restriction values. Ink quantity restriction values are recorded in the look-up table for all possible combinations of CMYK values set to 0% or 100%, where 100% denotes the value 255, which is the highest gradation value. The control unit 11 of the PC 1 calculates ink quantity restriction values for all other CMYK values through interpolation using these sixteen ink quantity restriction values.

According to the third embodiment described above, as with the printing system according to the second embodiment, when the input values for a halftone process are CMYK values and the sum of the CMYK values (the ink quantity index value) is the same for two different target pixels, the PC 1 according to the third embodiment can set the ink quantity restriction values for these target pixels to different values that account for their different colors. Hence, unlike the PC 1 according to the first embodiment that sets the ink quantity restriction value based on the sum of the CMYK values, the PC 1 according to the third embodiment can more suitably adjust the CMYK values for the target pixels.

4. Fourth Embodiment

4-1. Differences from the Printing System According to the First Embodiment The printing system according to a fourth embodiment of the present invention is identical to the printing system according to the first embodiment, differing only in the timing and content of the ink quantity adjustment process.

In the first embodiment, the ink quantity adjustment process (S13) is performed after the color conversion process (S11) and the total ink quantity restriction process (S12). In contrast, the ink quantity adjustment process in the fourth embodiment is performed prior to the color conversion process.

Further, in the first embodiment, in S31 the PC 1 finds or determines the ink quantity index value of a target pixel by calculating the sum of the CMYK values for the target pixel (i.e., the gradation values for the color components CMYK produced in the color conversion process), and in S34-S39 adjusts the CMY values so that the ink quantity index value is adjusted to the ink quantity restriction value when the ink quantity index value is greater than the ink quantity restriction value (S33:YES). In contrast, the PC 1 according to the fourth embodiment finds the lightness and saturation of a target pixel based on the RGB values of the pixel (gradation values for the color components RGB prior to the color conversion process) and adjusts the RGB values so that their lightness and saturation are equivalent to a calibration value (target value) when at least one of the lightness and saturation values requires calibration. By correcting lightness in the increasing direction and correcting saturation in the decreasing direction, it is expected that the calibrated RGB values will have a low ink quantity index value when converted to CMYK values. Hence, the PC 1 of the fourth embodiment uses lightness and saturation as index values related to the density of the pixel. In the following description, reference numerals in the first embodiment are appropriated to common parts and components in the fourth embodiment, and a description of aspects common to both embodiments is not repeated.

4-2. Detailed Description of Processes Performed on the Printing System

Figure 9:
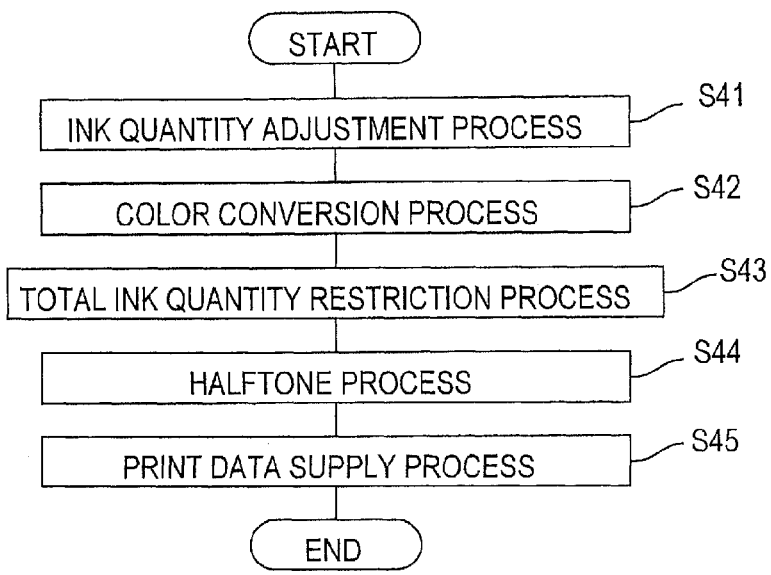
FIG. 9 is a flowchart illustrating steps in a process that is executed by a personal computer according to a fourth embodiment when the personal computer functions as a printer driver.

Next, a process according to the fourth embodiment executed by the control unit 11 of the PC 1 in place of the process in FIG. 3 will be described with reference to the flowchart in FIG. 9. The processes indicated in FIG. 9 are identical to those shown in FIG. 3, except for the ink quantity adjustment process.

In S41 the control unit 11 performs the ink quantity adjustment process on original image data representing the image to be printed. The original image data is represented by 256-level RGB values. The ink quantity adjustment process is performed to reduce the overall quantity of ink used for printing the last raster of a band. This process will be described later in greater detail. In S42 the control unit 11 performs a color conversion process in order to generate image data expressed in 256-level CMYK values from the image data resulting from the ink quantity adjustment process (image data represented by 256-level RGB values). In S43 the control unit 11 performs the total ink quantity restriction process for all image data produced from the color conversion process in order to reduce the overall quantity of ink used in printing. The process of S43 is the same as the process of S12 in the first embodiment. That is, the control unit 11 performs a process on all pixels in the image data to adjust the CMYK values so that an ink quantity index value for each pixel is restricted to no more than 140%. In S44 the control unit 11 performs a halftone process on the image data resulting from the total ink quantity restriction process (represented by 256-level CMYK values) to generate print data represented by 4-level CMYK values. In S45 the control unit 11 performs the print data supply process for transferring print data to the printer 2.

Figure 10:
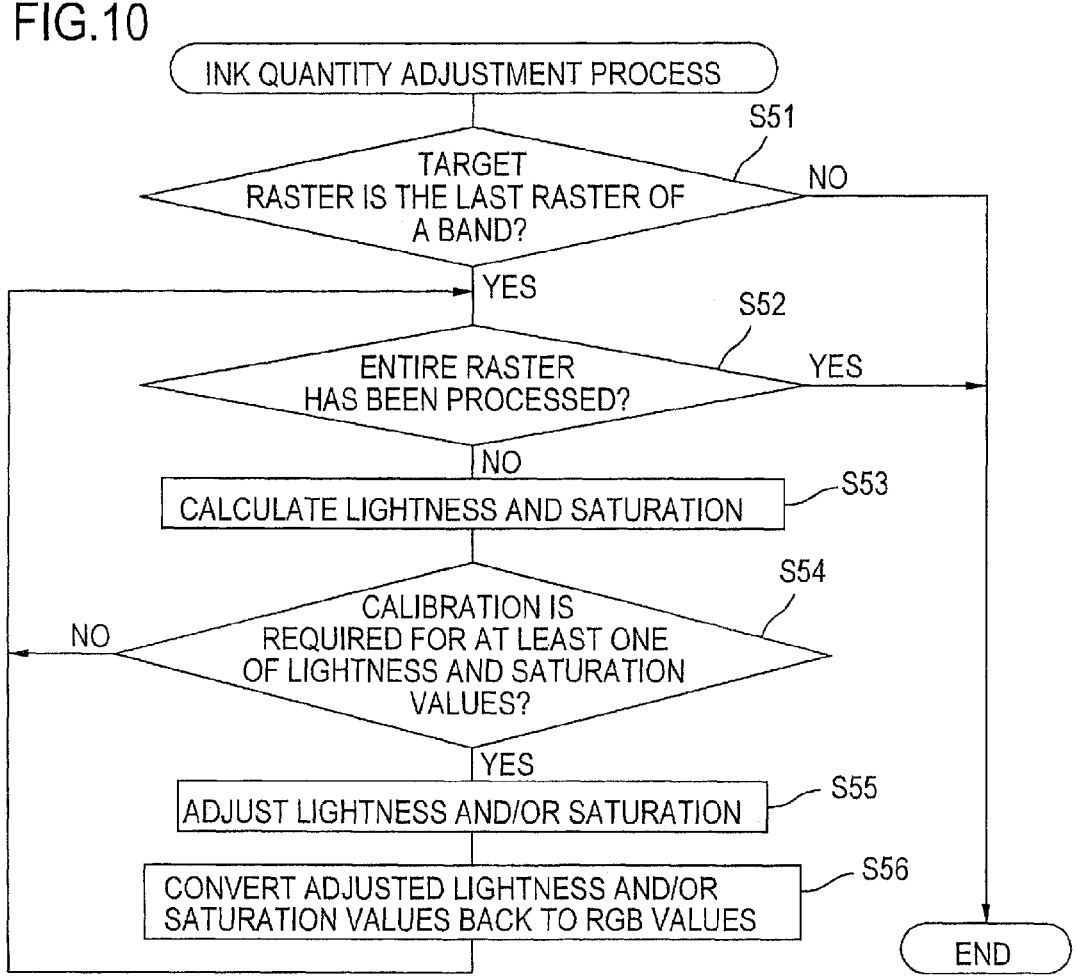
FIG. 10 is a flowchart illustrating steps in the ink quantity adjustment process according to the fourth embodiment.

Next, the ink quantity adjustment process of S41 will be described in greater detail with reference to the flowchart in FIG. 10. The control unit 11 executes the process in FIG. 10 for each line worth of image data corresponding to one raster of the image.

In S51 at the beginning of the ink quantity adjustment process, the control unit 11 determines whether the target raster is the last raster of a band. When the control unit 11 determines that the target raster is not the last raster (S51: NO), the control unit 11 ends the ink quantity adjustment process without taking any action.

However, if the control unit 11 determines that the target raster is the last raster (S51: YES), in S52 the control unit 11 determines whether the process beginning from S53 has been performed for every pixel in the line worth of image data corresponding to the target raster (last raster).

When the control unit 11 determines in S52 that unprocessed pixels remain (S52: NO), in S53 the control unit 11 calculates the lightness and saturation of the current pixel according to Equations (2)-(5) below. Here, the control unit 11 calculates lightness (Y value) by substituting the RGB values for the target pixel into Equation (2); calculates Cb and Cr values by substituting the RGB values of the target pixel into Equations (3) and (4); and calculates saturation (C value) by substituting the values Cb and Cr found above into Equation (5). In this example, the control unit 11 converts RGB values to YCbCr values, but the control unit 11 may convert RGB values to Lab values instead, for example.

Lightness $Y=0.29891*R+0.58661*G+0.11448*B$   Equation (2)

$Cb=-0.16874*R-0.33126*G+0.50000*B$   Equation (3)

$Cr=0.50000*R-0.41869*G-0.08131*B$   Equation (4)

Saturation $C=\sqrt{Cb^2+Cr^2}$   Equation (5)

In S54 the control unit 11 determines whether calibration is required for at least one of the lightness and saturation values calculated in S53. The basis for making this determination will be described next.

Figure 11:
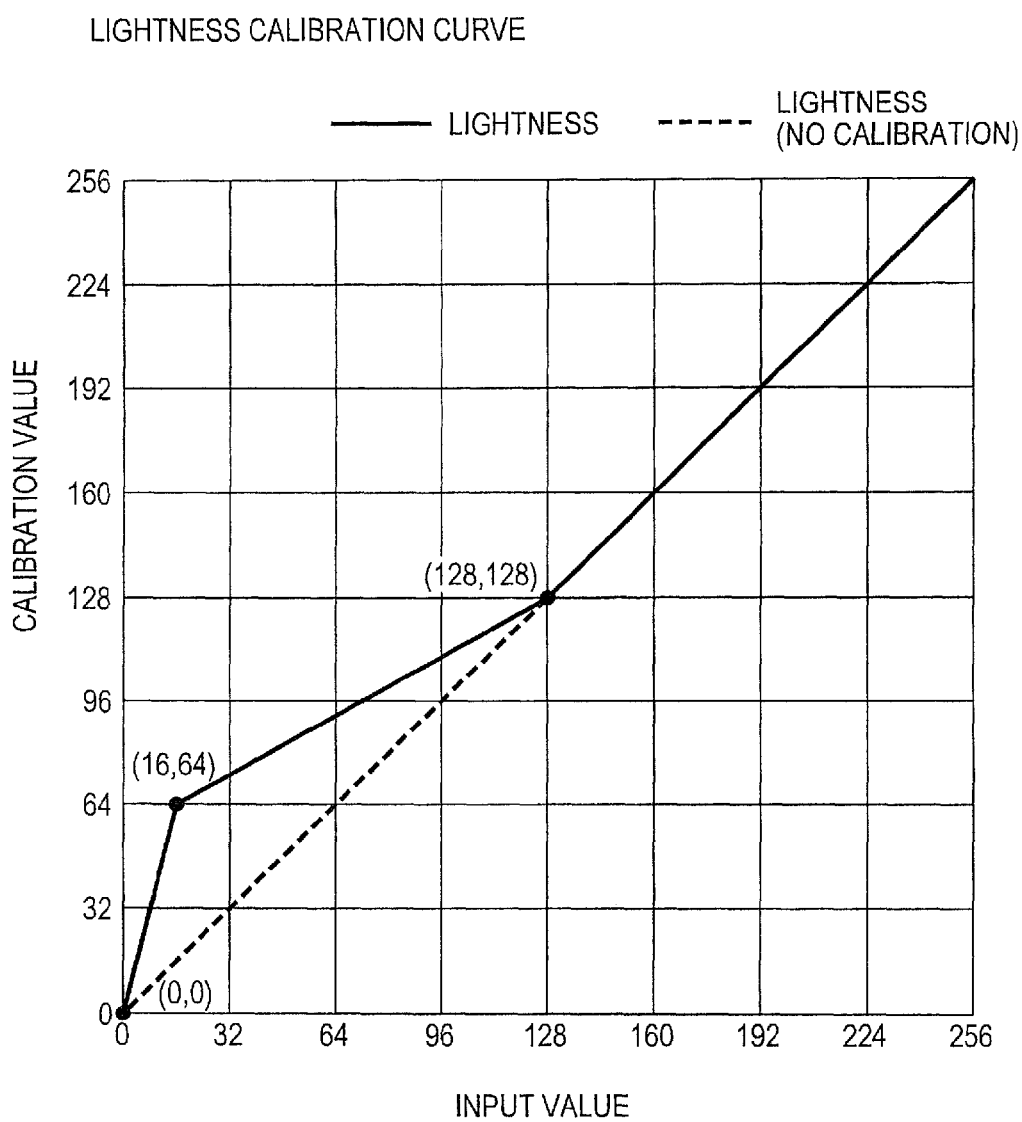
FIG. 11 is a graph showing correlations between input values and calibration values for lightness.

FIG. 11 is a graph of a lightness calibration curve indicating correlations between input values and calibration values (target values) for lightness. These correlations are prestored in the storage unit 12 as a computational expression or a look-up table. The correlations in this example are set such that lightness is not calibrated (input value=calibration value) when the input value is equal to 0 or greater than or equal to 128 and such that lightness is calibrated in the increasing direction (input value<calibration value) when the input value is greater than 0 but less than 128. More specifically, the calibration value is set to 64 for an input lightness value of 16. The calibration value increases linearly from 0 to 64 as the input value for lightness increases from 0 to 16 and increases linearly from 64 to 128 as the input value for lightness increases from 16 to 128.

If the lightness value were not calibrated, printing density would be high for pixels with low lightness and low for pixels with high lightness. Accordingly, calibration values in FIG. 11 have been set to increase lightness (reduce printing density) with a range of low lightness values (the range of input values 0-128), while lightness values are effectively not calibrated within a higher range (the range of input values 128-256).

In S54 the control unit 11 determines that calibration is not required for lightness when the input value for lightness is equal to 0 or greater than or equal to 128 and determines that calibration is required for lightness when the input value for lightness is greater than 0 but less than 128. Here, the calibration value is set to 0 for a lightness input value of 0 in order to avoid reducing the K value representing black (RGB=0, 0, 0).

Figure 12:
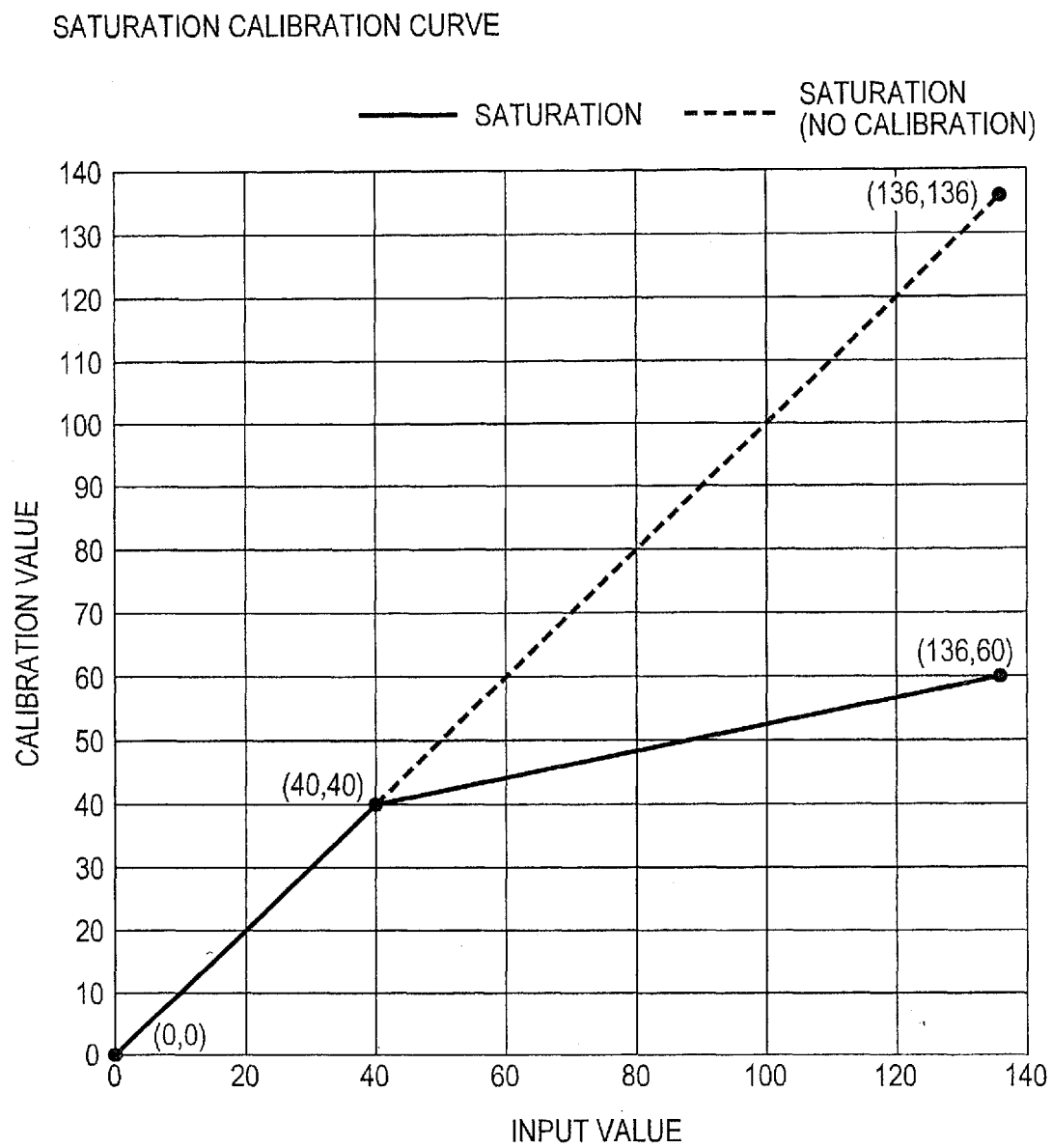
FIG. 12 is a graph showing correlations between input values and calibration values for saturation.

FIG. 12 is a graph of a saturation calibration curve indicating correlations between input values and calibration values (target values) for saturation. These correlations are prestored in the storage unit 12 as a computational expression or a look-up table. Correlations in this example are set such that saturation is not calibrated (input value=calibration value) when the input value is no greater than 40 and such that saturation is calibrated in the decreasing direction (input value>calibration value) when the input value is greater than 40. More specifically, the calibration value is set to 60 for an input saturation value of 136, and calibration values increase linearly from 40 to 60 as the input value for saturation increases from 40 to 136.

If saturation were not calibrated, the printing density would be high for pixels with high saturation and low for pixels with low saturation. Accordingly, the calibration values in FIG. 12 have been set such that saturation decreases (printing density decreases) for a range of high saturation values (the range of input values 40-136). However, calibration is effectively not performed for a range of lower saturation values (the range of input values 0-40).

In S54 the control unit 11 determines that calibration is not required for saturation when the input value for saturation is 40 or less and determines that calibration is required when the input value is greater than 40. Here, the maximum input value has been set to 136 because the maximum value for saturation C is 136.14 in Equations (2)-(5).

The control unit 11 returns to S52 when determining in S54 that calibration is not required for either lightness or saturation. However, when determining in S54 that calibration is required for at least one of the values for lightness and saturation (S54: YES), in S55 the control unit 11 adjusts (modifies) the lightness and/or saturation value that requires calibration to the calibration value corresponding to its input value.

In S56 the control unit 11 converts the lightness value and the saturation value, at least one of which has been adjusted in S55, back to RGB values according to Equations (6)-(11) below, and subsequently returns to S52. As shown below, the control unit 11 calculates the hue (h value) by substituting the values Cb and Cr found in S53 into Equation (6); calculates values Cb and Cr by substituting the hue calculated above and the adjusted saturation (C value) into Equations (7) and (8); and calculates RGB values by substituting the Cb and Cr values calculated above and the adjusted lightness (Y value) into Equations (9)-(11).

$$\text{hue } h = \tan^{-1}(Cr/Cb) \quad \text{Equation (6)}$$

$$Cb = C^* \cos(h) \quad \text{Equation (7)}$$

$$Cr = C^* \sin(h) \quad \text{Equation (8)}$$

$$R = Y + 1.40200^* Cr \quad \text{Equation (9)}$$

$$G = Y - 0.34414^* Cb - 0.71414^* Cr \quad \text{Equation (10)}$$

$$B = Y + 1.77200^* Cb \quad \text{Equation (11)}$$

The control unit 11 ends the ink quantity adjustment process upon determining in S52 that the process beginning from S53 has been performed for all pixels in the line worth of image data corresponding to the target raster (i.e., that no unprocessed pixels remain).

According to the fourth embodiment described above, the PC 1 processes image data prior to the halftone process by adjusting pixel values for target pixels belonging to the last raster of each band in order to reduce the density of pixels having a relatively high density. More specifically, the PC 1 of the fourth embodiment adjusts the RGB values of target pixels in image data that has not yet undergone color conversion by adjusting the input values for lightness and/or saturation of the target pixels to calibration values. Since the quantity of ink used in printing tends to lessen when the lightness of the target pixel is increased or when the saturation is decreased, these adjustments can suitably reduce the quantity of ink used for printing the last raster of a band. As a result, the PC 1 according to the fourth embodiment can reduce the occurrence of streaks at borders between two neighboring bands printed in two different main scans.

5. Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

Figure 6A:
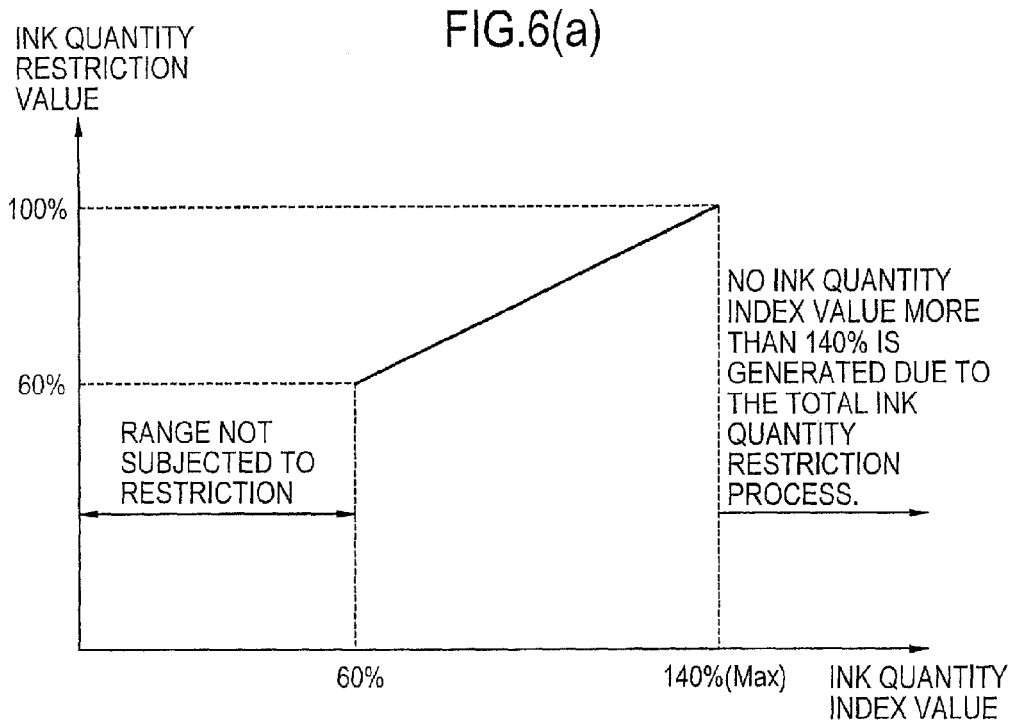
FIG. 6(*a*) is a graph showing correlations between ink quantity index values and ink quantity restriction values that increase linearly as the ink quantity index values increase.
Figure 6B:
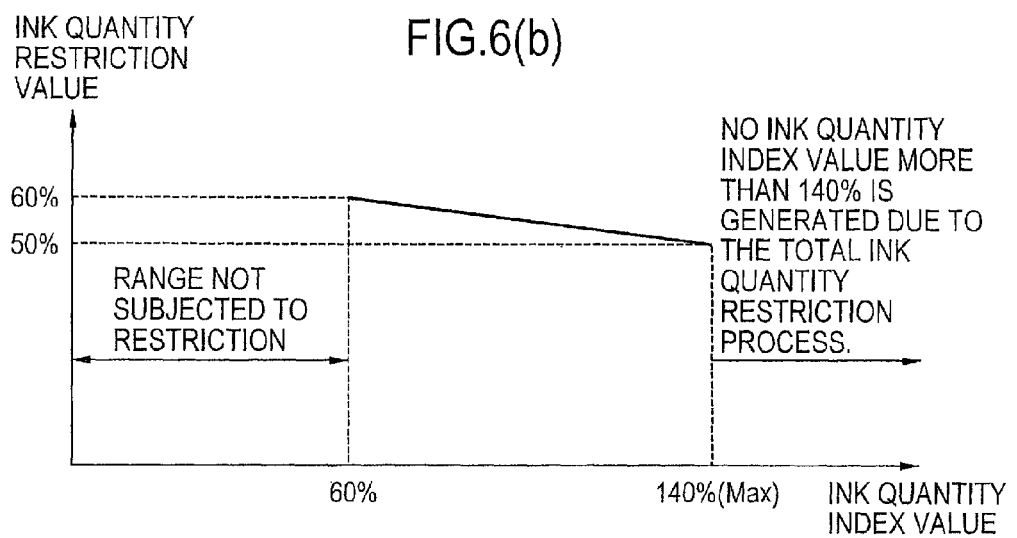

(1) For example, in the first embodiment described above, correlations between ink quantity index values and ink quantity restriction values are set such that the ink quantity restriction values increase linearly in response to an increase in the ink quantity index values, as shown in FIG. 6(a). However, as an alternative shown in FIG. 6(b), the correlations may be set such that the ink quantity restriction values decrease linearly in response to an increase in the ink quantity index values (i.e., so that the smallest ink quantity restriction value is set for the largest ink quantity index value). This correlation can be effective when a long time elapses after printing a preceding band and before printing a succeeding band, for example, because ink droplets printed in the preceding band at positions near the borderline can spread over a greater area.

More specifically, it is desirable to prevent newly-printed ink droplets from being laid over already-printed ink droplets which have spread on the paper as described already with reference to FIG. 2(b). Generally, ink spreads over a wider area as a longer time elapses after the ink is printed on the paper. So, as the longer time elapses after ink droplets are printed, newly-printed ink droplets will be more likely laid over the already-printed ink droplets. On the other hand, ink droplets will spread wider in such part of an image where more quantity of ink is printed. So, in the case where a long time will elapse after printing a preceding band and before printing a succeeding band, it is especially desirable to largely reduce the quantity of ink for such part of image data that requires printing of large quantity of ink. According to the correlations shown in FIG. 6(b), the amount of reduction from the ink quantity index value to the ink quantity restriction value is especially large at the maximum ink quantity index value. So, quantity of ink can be largely reduced for such part of image data that requires printing of a large quantity of ink.

Further, the ink quantity restriction value may be changed in steps, for example, in response to changes in the ink quantity index value and need not change linearly, provided that the ink quantity restriction value changes monotonically in response to changes in the ink quantity index value. It is noted that "changing monotonically" indicates changing in one direction, such as only increasing without decreasing or only decreasing without increasing. Monotonically changing ink quantity restriction values may include linear changes, changes in steps, and the like.

Figure 13A:
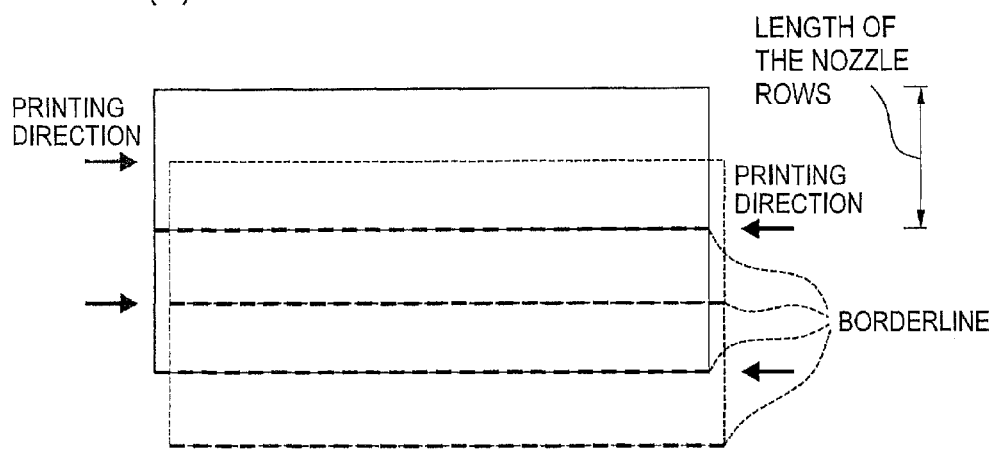
FIG. 13(*a*) is an explanatory diagram showing streaks that can be produced in two-pass printing when the paper is conveyed by uniform amounts in the sub-scanning direction.
Figure 13B:
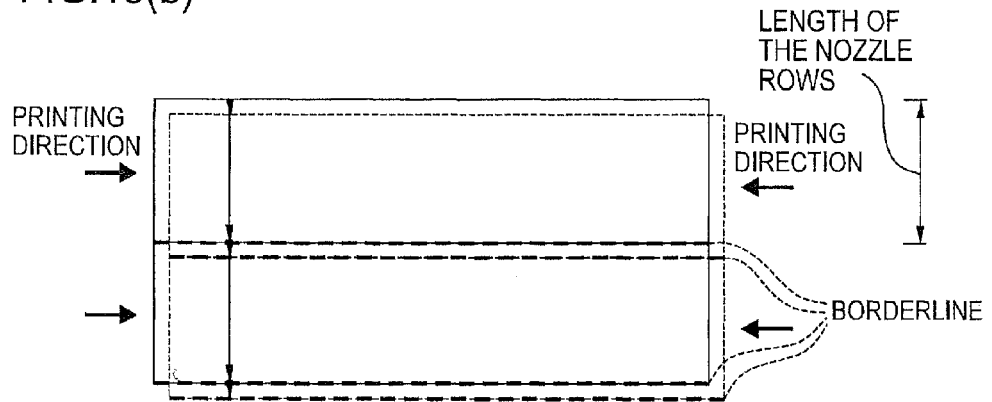

(2) The embodiments described above assume that the printer 2 performs single-pass printing. However, the ink quantity adjustment process described in the embodiments is also effective for multi-pass printing in which the printer 2 prints a prescribed unit of an image in a plurality of main scans (multiple passes) while conveying the sheet of paper a distance shorter than the length of the nozzle rows for each main scan of the print head 27. In some cases, streaks may be produced at the borderline between two adjacent bands when performing two-pass printing, for example, as illustrated in FIG. 13(a). Further, while FIG. 13(a) shows a case in which the paper-conveying distance in the sub scanning direction is uniform, streaks may also occur when the paper-conveying distance in the sub scanning direction is nonuniform, as illustrated in FIG. 13(b). While these examples show alternating scanning directions, the same results will occur when the same scanning direction is used. Further, the band regions in these drawings are offset from each other in the left-to-right direction in order to better distinguish the different passes, although their actual left-to-right positions are identical.

(3) The embodiments describe an ink quantity adjustment process for reducing the total quantity of ink used in printing the last raster of bands, but the present invention is not limited to this process. For example, the ink quantity adjustment process may reduce the total quantity of ink used for printing the first raster in each band (the first raster of the current band on the side neighboring a band printed prior to the current band) as well as, or instead of, reducing the total quantity of ink used for printing the last raster of the band. Further, the ink quantity adjustment process may be performed for image data in a plurality of lines rather than for one line worth of image data. However, executing the ink quantity adjustment process only on one line worth of image data in each band enables the image processing device to perform the adjustments more quickly than when performing the ink quantity adjustment process on image data for a plurality of lines.

(4) In the embodiments described above, the present invention is applied to a printer 2 that is capable of reproducing 4-level print data, but the present invention may be applied to a printer capable of reproducing print data of 2, 3, or more levels, for example.

(5) In the embodiments described above, the ink quantity adjustment process is executed by the PC 1, but this process may be executed on the printer 2, for example. In this case, the control unit 21 of the printer 2 supplies the generated print data to the printing unit 26 in the print data supply process (S15, S45).

(6) In the embodiments described above, the program of the printer driver 123 is stored in the storage unit 12. However, the program of the printer driver 123 may be originally stored in any type of storage medium or device readable by the computer 1 or the printer 2, and be downloaded to the computer 1 or the printer 2.

What is claimed is:

1. An image processing device for processing image data indicative of an image to be printed by a print execution section, the print execution section having a print head that is reciprocated in a main scanning direction and that is capable of printing a partial image in a unit printing area for each main scan, the image processing device comprising:
    a process section configured to execute an image process on image data so as to generate processed image data;
    a generation section configured to execute a halftone process on the processed image data so as to generate print data; and
    a supply section configured to supply the print data to the print execution section;
    the process section comprising:
        a color conversion section configured to convert the image data, expressed in gradation values for a plurality of first color components defined in a first color system, into converted image data, expressed in gradation values for a plurality of second color components, the plurality of second color components being defined in a second color system and corresponding to a plurality of ink colors used in printing;
        an index value determination section configured to determine an index value for each of a plurality of target pixels included in edge image data, the index value for each target pixel being related to density of the target pixel, wherein the edge image data corresponds to an edge portion of a unit printing area and is part of partial image data within the image data, and the partial image data corresponds to the unit printing area, the index value determination section being further configured to determine the index value of the target pixel based on gradation values for the plurality of second color components that serve as the pixel value of the target pixel; and
        an adjustment section configured not to adjust a pixel value of the target pixel in a first case where the density of the target pixel is determined to be relatively low based on the index value of the target pixel, and configured to adjust the pixel value of the target pixel so as to reduce the density of the target pixel in a second case where the density of the target pixel is determined to be relatively high based on the index value of the target pixel,
    the adjustment section being further configured, in the second case, to adjust the gradation value for at least one of the plurality of second color components in the target pixel so that the index value of the target pixel is adjusted to a target value, and
    the adjustment section being further configured, in the second case, not to adjust a gradation value for a second color component in the target pixel with respect to pigment ink, but to adjust a gradation value for a second color component with respect to dye-based ink.

2. An image processing device according to claim 1, wherein the index value determination section is configured to set a sum of gradation values for the second color components in the target pixel as the index value of the target pixel.

3. An image processing device according to claim 1, wherein the adjustment section is configured, in the second case, to set a gradation value for the second color component in the target pixel with respect to dye-based ink to zero (0) when the gradation value for the second color component with respect to pigment ink exceeds the target value.

4. An image processing device according to claim 1, wherein the adjustment section is configured, in the second case, to adjust a plurality of gradation values in the target pixel for a plurality of second color components with respect to dye-based ink by the same ratio.

5. An image processing device according to claim 1, wherein the adjustment section is configured to set the target value of the target pixel corresponding to the index value of the target pixel based on predetermined correlations between the index values and the target values, wherein the target values change monotonically in response to changes in the index values.

6. An image processing device according to claim 1, wherein the adjustment section is configured to set the target value of the target pixel corresponding to the index value of the target pixel based on predetermined correlations between a plurality of combinations of gradation values for a plurality of first color components in the first color system and the target values.

7. An image processing device according to claim 1, wherein the adjustment section is configured to set the target value of the target pixel corresponding to the index value of the target pixel based on predetermined correlations between a plurality of combinations of gradation values for a plurality of second color components in the second color system and the target values.

8. An image processing device according to claim 1, wherein the image data is expressed in gradation values for a plurality of first color components defined in a first color system,
    the index value determination section is configured to determine an index value of the target pixel based on gradation values for the plurality of first color components that serve as the pixel value of the target pixel; and the adjustment section is configured to adjust the gradation value for at least one of the plurality of first color components in the target pixel in the second case so that the index value of the target pixel is adjusted to a target value, the process section further comprises a color conversion section configured to convert the image data, which has been selectively adjusted by the adjustment section, into adjusted-and-converted image data, which is expressed in gradation values for a plurality of second color components defined in a second color system and corresponding to a plurality of ink colors used in printing.

9. An image processing device according to claim 8, wherein the index value determination section is configured to determine, as the index value of the target pixel, a saturation-related index value that is related to saturation of the target pixel;

the target value includes a saturation-related target value related to target saturation; and the adjustment section is configured to adjust the gradation value for at least one of the plurality of first color components in the target pixel in the second case so that the saturation-related index value for the target pixel is adjusted to the saturation-related target value.

10. An image processing device according to claim 8, wherein the index value determination section is configured to determine, as the index value of the target pixel, a lightness-related index value that is related to lightness of the target pixel;

the target value includes a lightness-related target value related to target lightness; and the adjustment section is configured to adjust the gradation value for at least one of the plurality of first color components in the target pixel in the second case so that the lightness-related index value for the target pixel is adjusted to the lightness-related target value.

11. An image processing device according to claim 8, wherein the adjustment section is configured to set the target value for the target pixel corresponding to the index value of the target pixel based on predetermined correlations between the index values and the target values, wherein the target values change monotonically in response to changes in the index values.

12. An image processing device according to claim 1, wherein the edge image data is line image data corresponding to one line along an edge part of the unit printing area.

13. An image processing device according to claim 1, wherein the edge image data includes data corresponding to one of two edge parts in the unit printing area on a side of the unit printing area adjacent to the next unit printing area to be printed.

14. An image processing device according to claim 1, wherein the process section further includes an ink reduction process section configured to execute a process on all pixels' worth of image data for reducing the quantity of ink used in printing.

15. An image processing device according to claim 1,
wherein if the density of the target pixel related to the index value is lower than or equal to a density related to a target value, the density of the target pixel is determined to be relatively low,
wherein if the density of the target pixel related to the index value is higher than the density related to the target value, the density of the target pixel is determined to be relatively high, and wherein the adjustment section is configured to adjust the pixel value of the target pixel so that the index value of the target pixel changes closer toward the target value if the density of the target pixel is determined to be relatively high.

16. A method of processing image data indicative of an image to be printed by a print execution section, the print execution section having a print head that is reciprocated in a main scanning direction and that is capable of printing a partial image in a unit printing area for each main scan, the method comprising:

executing an image process on image data to generate processed image data;

executing a halftone process on the processed image data to generate print data; and supplying the print data to the print execution section;

the executing the image process comprising:

converting the image data, expressed in gradation values for a plurality of first color components defined in a first color system, into converted image data, expressed in gradation values for a plurality of second color components, the plurality of second color components being defined in a second color system and corresponding to a plurality of ink colors used in printing;

determining an index value for each of a plurality of target pixels included in edge image data, the index value for each target pixel being related to density of the target pixel, wherein the edge image data corresponds to an edge portion of a unit printing area and is part of partial image data within the image data, and the partial image data corresponds to the unit printing area, the index value of the target pixel being determined based on gradation values for the plurality of second color components that serve as the pixel value of the target pixel; and failing to adjust a pixel value of the target pixel in a first case where the density of the target pixel is determined to be relatively low based on the index value of the target pixel, and adjusting the pixel value of the target pixel so as to reduce the density of the target pixel in a second case where the density of the target pixel is determined to be relatively high based on the index value of the target pixel, in the second case, the gradation value for at least one of the plurality of second color components in the target pixel being adjusted so that the index value of the target pixel is adjusted to a target value, in the second case, a gradation value for a second color component in the target pixel with respect to pigment ink being not adjusted, but gradation value for a second color component with respect to dye-based ink being adjusted.

17. A computer readable storage device storing a set of image-processing program instructions executable by a computer to process image data indicative of an image to be printed by a print execution section, the print execution section having a print head that is reciprocated in a main scanning direction and that is capable of printing a partial image in a unit printing area for each main scan, the program instructions comprising:

executing an image process on image data to generate processed image data;

executing a halftone process on the processed image data to generate print data; and supplying the print data to the print execution section;

the executing the image process comprising:

converting the image data, expressed in gradation values for a plurality of first color components defined in a first color system, into converted image data, expressed in gradation values for a plurality of second color components, the plurality of second color components being defined in a second color system and corresponding to a plurality of ink colors used in printing;

determining an index value for each of a plurality of target pixels included in edge image data, the index value for each target pixel being related to density of the target pixel, wherein the edge image data corresponds to an edge portion of a unit printing area and is part of partial image data within the image data, and the partial image data corresponds to the unit printing area, the index value of the target pixel being determined based on gradation values for the plurality of second color components that serve as the pixel value of the target pixel; and failing to adjust a pixel value of the target pixel in a first case where the density of the target pixel is determined to be relatively low based on the index value of the target pixel, and adjusting the pixel value of the target pixel so as to reduce the density of the target pixel in a second case where the density of the target pixel is determined to be relatively high based on the index value of the target pixel, in the second case, the gradation value for at least one of the plurality of second color components in the target pixel being adjusted so that the index value of the target pixel is adjusted to a target value, in the second case, a gradation value for a second color component in the target pixel with respect to pigment ink being not adjusted, but a gradation value for a second color component with respect to dye-based ink being adjusted.

* * * * *